United States Patent
Lever

[11] Patent Number: 5,988,689
[45] Date of Patent: Nov. 23, 1999

[54] HEAT-SHRINKABLE ELECTROFUSION FITTINGS AND METHODS

[75] Inventor: Ernest Lever, Shawnee, Okla.

[73] Assignee: Central Plastics Company, Shawnee, Okla.

[21] Appl. No.: 08/998,524

[22] Filed: Dec. 26, 1997

[51] Int. Cl.⁶ .................................................. F16L 47/02
[52] U.S. Cl. ..................... 285/21.1; 285/21.2; 285/381.5
[58] Field of Search ........................... 285/381.1, 381.4, 285/381.5, 21.1, 21.2, 21.3

[56] References Cited

U.S. PATENT DOCUMENTS

| | | | |
|---|---|---|---|
| 3,166,402 | 1/1965 | Berson et al. | 75/5 |
| 3,276,929 | 10/1966 | Ferch | 156/83 |
| 3,415,287 | 12/1968 | Heslop et al. | 285/381.5 |
| 3,487,137 | 12/1969 | Kopel | 264/111 |
| 3,957,382 | 5/1976 | Greuel, Jr. et al. | 285/381.5 |
| 4,092,193 | 5/1978 | Brooks | 285/21.1 |
| 4,699,743 | 10/1987 | Nakamura et al. | 264/104 |
| 4,853,165 | 8/1989 | Rosenzweig et al. | 264/27 |
| 4,896,904 | 1/1990 | Gadsden et al. | 285/381.5 |
| 4,952,438 | 8/1990 | Kipfelsberger et al. | 428/68 |
| 4,985,287 | 1/1991 | Tachibana | 428/34.5 |
| 5,000,875 | 3/1991 | Kolouch | 252/511 |
| 5,033,775 | 7/1991 | Matte et al. | 285/150 |
| 5,272,216 | 12/1993 | Clark, Jr. et al. | 525/362 |
| 5,272,238 | 12/1993 | Garnier et al. | 528/9 |
| 5,277,867 | 1/1994 | Ueda et al. | 419/54 |
| 5,317,045 | 5/1994 | Clark, Jr. et al. | 523/300 |
| 5,321,060 | 6/1994 | Oliver et al. | 523/220 |
| 5,338,920 | 8/1994 | Okusaka et al. | 285/21.2 |
| 5,388,869 | 2/1995 | Suzuki et al. | 285/197 |
| 5,391,595 | 2/1995 | Clark, Jr. et al. | 523/300 |
| 5,470,622 | 11/1995 | Rinde et al. | 285/381.5 |
| 5,482,087 | 1/1996 | Overbergh et al. | 285/381.5 |
| 5,576,358 | 11/1996 | Lem et al. | 523/153 |
| 5,644,837 | 7/1997 | Fathi et al. | 29/832 |
| 5,648,013 | 7/1997 | Uchida et al. | 252/62.54 |
| 5,662,362 | 9/1997 | Kapgan et al. | 285/381.1 |
| 5,755,465 | 5/1998 | Stewart, Jr. et al. | 285/381.5 |

FOREIGN PATENT DOCUMENTS

| | | | |
|---|---|---|---|
| 2250950 | 6/1975 | France | 285/21 |
| 3436986 | 4/1986 | Germany | 285/381 |
| 40-6074377 | 3/1994 | Japan | 285/381 |
| 40-6213387 | 8/1994 | Japan | 285/21 |
| 1590814 | 9/1990 | U.S.S.R. | 285/381 |
| 1656273 | 6/1991 | U.S.S.R. | 285/21 |

*Primary Examiner*—Eric K. Nicholson
*Attorney, Agent, or Firm*—C. Clark Dougherty, Jr.

[57] ABSTRACT

The present invention provides improved heat-shrinkable electrofusion fittings and methods. The fittings are basically comprised of an electrically heatable tubular plastic outer member which is shrinkable when heated to a transition temperature, an electrically heatable tubular plastic inner member positioned within the outer member which has a fusion temperature higher than the transition temperature and an electrically activated induction coil for energizing the inner and outer members.

21 Claims, 2 Drawing Sheets

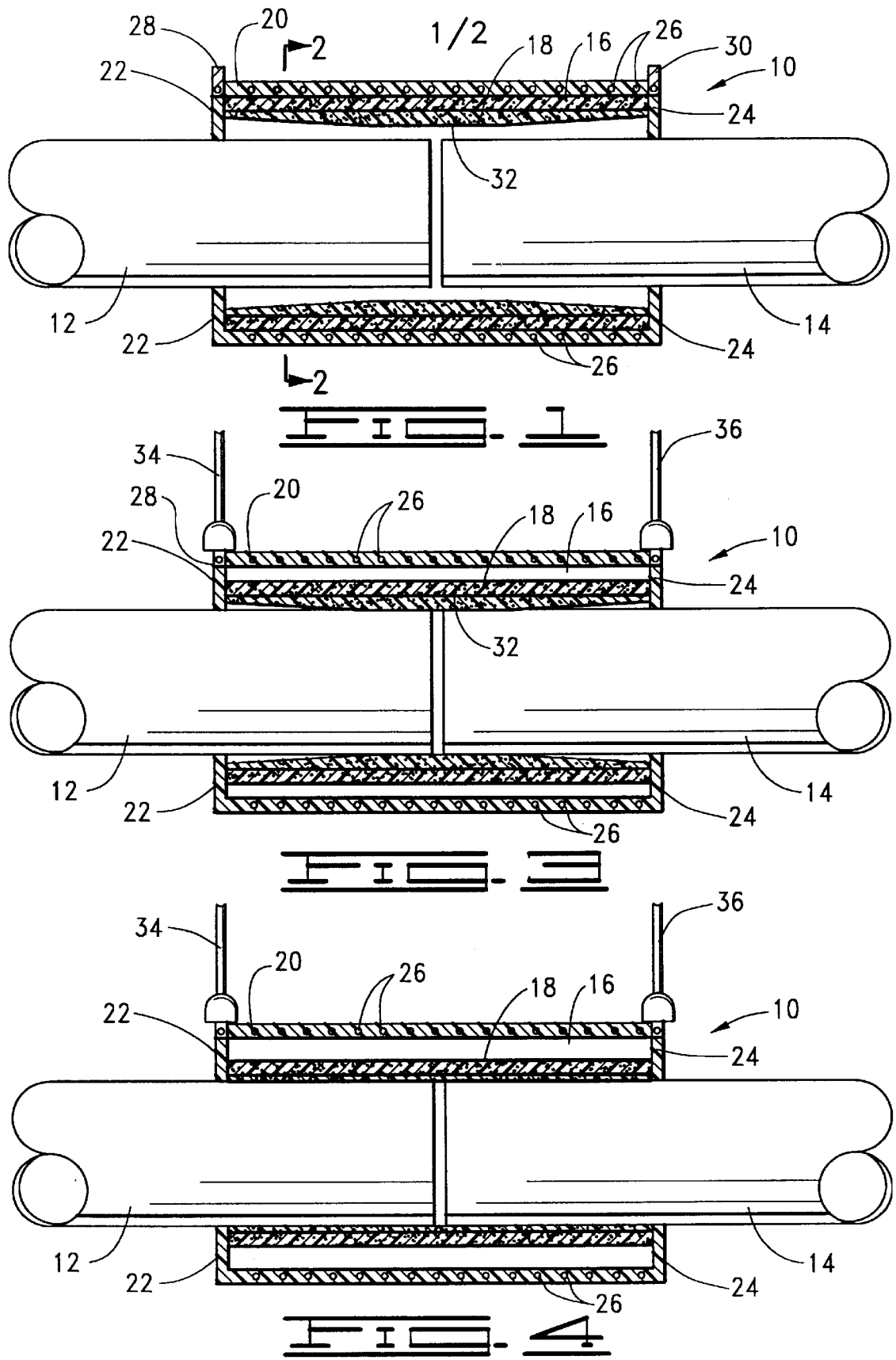

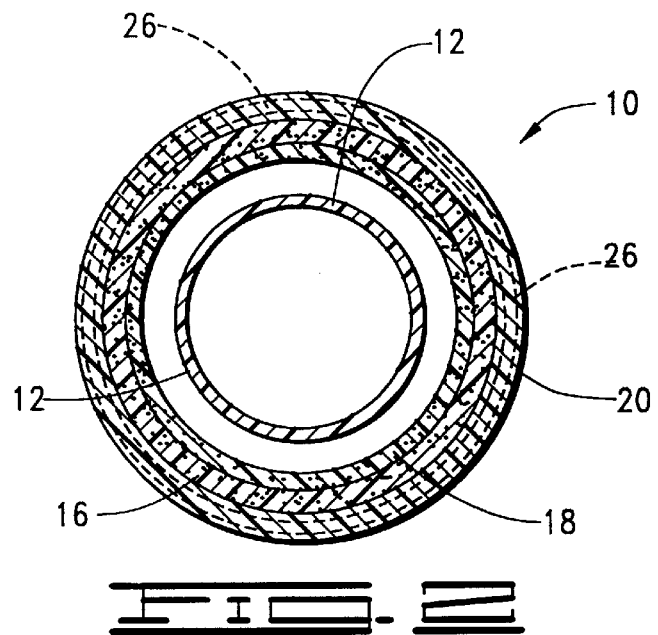
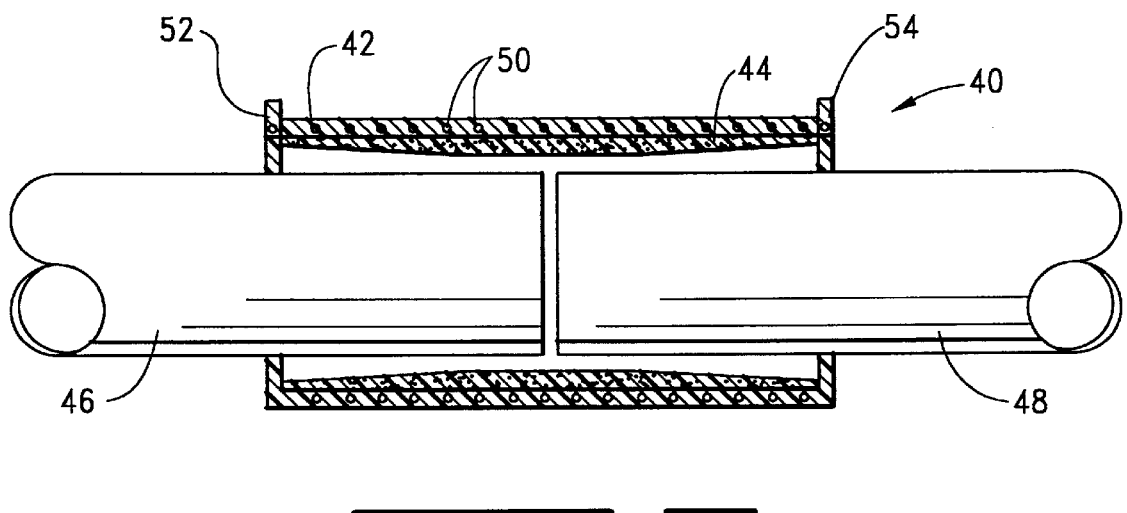
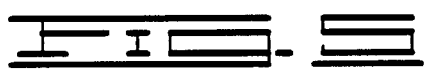

HEAT-SHRINKABLE ELECTROFUSION FITTINGS AND METHODS

BACKGROUND OF THE INVENTION

1. Field of the Invention

This invention relates to electrofusion plastic fittings, and more particularly, to improved heat-shrinkable electrofusion fittings for sealingly connecting the ends of pipes or tubular fittings.

2. Description of the Prior Art

A variety of electrofusion plastic fittings have heretofore been developed and used for joining the ends of plastic pipes or other tubular plastic fittings such as tees, ells, crosses and the tubular connecting ends of plastic valves and the like which are adapted to be connected in plastic piping systems. Some of such electrofusion fittings include electric resistance heating coils disposed therein. When an electric current is applied to the coil of such a fitting, the plastic material making up the fitting adjacent to the coil is melted and the fitting is sealingly fused with one or more complimentary plastic fittings or pipes. Other electrofusion fittings have been developed and used which include particulate ferro-magnetic and/or other conductive fillers. The fillers cause the entire fittings to be heated when the fillers are electrically energized.

In order to allow the easy assembly of an electrofusion fitting with a complementary plastic fitting, space must exist between the surfaces of the fittings to be fused. In the smaller sizes of fittings, the space is filled by the volumetric expansion of plastic material as it changes from the solid phase to the liquid phase. That is, in smaller fittings, a sufficiently large volume of plastic material undergoes a phase change to fill the space between the fittings during the heating cycle and still allow sufficient time for good bonding to take place before the end of the fusing process. In large diameter fittings, the space is larger and obtaining a good fused joint is more difficult. A further problem with large diameter fittings is the separation of the layers on either side of the interface between the fittings due to shrinkage of the molten region as it cools.

Electrofusion fittings have heretofore been heat-shrinkable so that when the fittings are heated, they advantageously shrink to a smaller size and exert clamping pressure on the complimentary fitting or fittings to be fused. While such heat-shrinkable fittings solve some of the above mentioned problems, in order to fuse such fittings they must be heated to above their melting temperatures which makes the fusing process difficult to control. In order to overcome those problems, inserts formed of lower temperature fusable plastic materials have been placed between the shrinkable fittings and the complimentary fittings to which they are to be fused. However, the inserts must be heated by heat from the shrinkable fittings which again makes the fusing process difficult to control.

Another problem which is common to all electrofusion fittings involves the oxidization of the surfaces of the complimentary fittings to be fused. After a plastic pipe or fitting is exposed to the atmosphere for a period of time, its outer surfaces become highly oxidized which inhibits the fusing process. That is, unless the outer surface of the complimentary fitting is thoroughly scraped before fusion, a good fused joint will very often not be obtained.

Thus, the prior art electrofusion fittings all suffer from one or more disadvantages, especially in obtaining good fused joints between the electrofusion fittings and complimentary pipes or fittings. Accordingly, there are continuing needs for improved electrofusion fittings and methods.

SUMMARY OF THE INVENTION

The present invention provides improved heat-shrinkable electrofusion fittings and methods which meet the needs described above and overcome the deficiencies of the prior art. The improved electrofusion fittings of this invention are basically comprised of an electrically heatable tubular plastic outer member which is shrinkable from a first size to a smaller second size when heated to a transition temperature. An electrically heatable tubular plastic inner member is positioned within the outer member which is heated to a fusion temperature higher than the transition temperature of the outer member. The inner member has an internal size for receiving at least one complimentary fitting to be fused thereto. An electrically activated induction coil is positioned with respect to the outer and inner members for simultaneously energizing and causing the members to be heated to the transition temperature and fusion temperature, respectively. When heated to its transition temperature, the outer member shrinks towards its smaller size and clamps the heated inner member against the complimentary fitting. Thereafter, the inner member reaches its fusion temperature, i.e., a temperature significantly higher than its melting point, whereby it fuses with the complimentary fitting. During fusion, the melted plastic material making up the inner member is caused to flow over the adjacent surface of the complimentary fitting under the pressure generated by the shrinking outer member which causes a good fused joint to be obtained even though the complimentary fitting is highly oxidized and has not been adequately scraped.

The methods of the invention basically comprise the steps of placing the end of at least one plastic pipe or tubular plastic fitting within a heat-shrinkable electrofusion fitting of this invention and then electrically activating the induction coil of the fitting to thereby shrink the outer member of the fitting towards its smaller size, clamp the inner member against the end of the pipe or fitting and fuse the inner member with the pipe or fitting.

It is, therefore, a general object of the present invention to provide improved heat-shrinkable electrofusion fittings and methods.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side cross-sectional view of a heat-shrinkable electrofusion fitting of the present invention having the ends of plastic pipes or tubular plastic fittings inserted therein.

FIG. 2 is a cross-sectional view taken along line 2—2 of FIG. 1.

FIG. 3 is a side cross-sectional view similar to FIG. 1 illustrating the electrofusion fitting after it has been electrically activated and the tubular outer member has shrunk to its smaller size.

FIG. 4 is a side cross-sectional view similar to FIG. 2 showing the electrofusion fitting after the inner member has fused with the ends of the pipes or fittings.

FIG. 5 is a side cross-sectional view of an alternate form of the heat-shrinkable electrofusion fitting of the present invention having the ends of plastic pipes or tubular plastic fittings inserted therein.

DESCRIPTION OF PREFERRED EMBODIMENTS

Referring now to the drawings and particularly to FIGS. 1–4, an improved heat-shrinkable electrofusion fitting of the present invention is illustrated and generally designated by the numeral 10. The fitting 10 is illustrated in the form of a coupling for joining the ends of plastic pipes or tubular plastic fittings 12 and 14 which are complimentary in size to the electrofusion fitting 10. The term "complimentary fitting" is used herein to mean the end of a plastic pipe, the tubular connecting parts of various plastic pipe fittings such as tees, ells, crosses and the like as well as the tubular connecting parts of plastic valves and other plastic structures adapted to be connected in plastic piping systems. While the heat-shrinkable electrofusion fitting 10 of the present invention is illustrated in the drawings in the form of a coupling, it will be understood by those skilled in the art that the fitting 10 can take various forms whereby it can be permanently joined at one end to a pipe, vessel or other plastic structure and utilized for providing a sealed joint with the end of a single plastic pipe or tubular plastic fitting.

The fitting 10 is basically comprised of an electrically heatable tubular plastic outer member 16 which is shrinkable from a first size as shown in FIGS. 1 and 2 towards a smaller second size (shown in FIGS. 3 and 4) when heated to a transition temperature. The term "transition temperature" is used herein to mean the temperature to which the outer member 16 must be heated to cause it to shrink from its first size to its smaller second size.

The outer member 16 is formed of a heat-shrinkable conductive polymeric composition. The conductive polymeric composition is comprised of an organic polymer and a particulate conductive filler. The organic polymer can be any of the well known organic polymers which are heat-shrinkable after being expanded at a high temperature and cooled in the expanded state. A particulate conductive filler is dispersed in the organic polymer, and the outer member 16 is then formed by any of a variety of methods, e.g., by molding, extruding or sintering, directly into its smaller second size and shape. Thereafter, the outer member is heated to a particular temperature, expanded to its enlarged size and cooled. The resulting outer member in its expanded state will have a transition temperature equal to the temperature at which it was expanded. When heated again to the transition temperature, it will shrink to its smaller size. Preferably, the outer member 16 of the present invention has a transition temperature in the range of from about 130° C. to about 150° C.

Suitable organic polymers which can be used to form the outer member 16 include, but are not limited to, cross-linked polyvinyl chloride, polypropylene and polyethylene. Most preferably the outer member 16 is formed from cross-linked polyethylene having a density in the range of from about 930 to about 950 kilograms per cubic meter and having a transition temperature of about 140° C.

The particulate conductive filler can be any of the various conductive fillers with specific Curie temperatures known to those skilled in the art including metal alloys and amorphous materials such as carbon. Preferably, the conductive filler is a ferromagnetic conductive filler comprised of iron alloyed with other elements such as phosphorous, chromium, nickel, boron, silicon or carbon. When such a ferromagnetic filler reaches its Curie temperature, the electromagnetic properties of the alloy change abruptly and it becomes paramagnetic. Thus, when a ferromagnetic particulate filler is blended with an organic polymer and the resulting polymer is subjected to an alternating electromagnetic field of suitable frequency, eddy currents are induced on the metal particles which generate ohmic heat. When the particles reach the Curie temperature of the alloy they become paramagnetic and the eddy currents cease. When the particles cool to below the Curie temperature they again become ferromagnetic and the eddy currents resume. The particulate ferromagnetic conductive filler utilized in the outer member 16 preferably has a Curie temperature in the range of from about 130° C. to about 150° C.

An electrically heatable tubular plastic inner member 18 comprised of an organic polymer and a particulate ferromagnetic filler is positioned within the outer member 16. The inner member 18 can be bonded to the outer member 16 or it can be loosely held within the outer member 16. The inner member 18 is of an internal size for receiving at least one complimentary fitting to be fused thereto. Like the outer member 16, the inner member 18 is heated when energized electrically. Preferably, the inner member 18 is formed of a thermoplastic material which has a melting point in the range of from about 120° C. to about 130° C. Suitable thermoplastic materials include medium density polyethylene and polyethylenes which have been modified to undergo crosslinking over a period of time. A particularly preferred such material is a medium density polyethylene which melts at about 125° C. Other thermoplastic materials which can be used to form the inner member 18 as well as various other polymeric materials which can be used to form the outer member 16 are listed in U.S. Pat. No. 4,853,165 issued to Rosenzweig, et al. on Aug. 1, 1989 which is incorporated herein by reference.

As described above relating to the particulate conductive filler used in the outer member 16, the particulate conductive filler used in the inner member 18 can be any of the conductive fillers having specific Curie temperatures known to those skilled in the art. Preferably, the filler is a ferromagnetic alloy which heats the inner member 18 to a fusion temperature in the range of from about 180° C. to about 220° C. Most preferably, the ferromagnetic alloy conductive filler heats the inner member 18 to a fusion temperature of about 180° C. As is well understood by those skilled in the art, the fusion temperature of a plastic part is significantly higher than its melting temperature because the outer layers of both it and the complimentary fitting to be fused with it must be melted and co-mingled.

In the embodiment illustrated in FIGS. 1–4, the fitting 10 includes an outer sleeve 20 within which the outer tubular member 16 and inner tubular member 18 are positioned and which includes annular end walls 22 and 24. The end walls 22 and 24 function to confine the outer member 16 and inner member 18 within the sleeve 20 and to center the complimentary pipes or fittings 12 and 14 within the fitting 10. The sleeve 20 and annular ends 22 and 24 thereof are preferably formed of a material which will not melt or otherwise disintegrate at the temperatures to which they are exposed during the operation of the fitting 10. Preferably, the sleeve 20 and annular ends 22 and 24 thereof are formed of a plastic material with suitable properties, e.g. polypropylene.

Molded within the sleeve 20 is a spirally configured induction coil 26 which is electrically connected to terminals 28 and 30 attached to and protruding from the sleeve 20. When activated, the induction coil 26 energizes the particulate ferromagnetic conductive fillers in the outer member 16 and the inner member 18. As a result, the members 16 and 18 are simultaneously heated to the transition temperature of the outer member 16, and the inner member 18 is thereafter heated to its fusion temperature. Since the transition temperature of the outer member 16 is lower than the fusion temperature of the inner member 18, when the outer member reaches its transition temperature it shrinks towards its smaller size and clamps against the inner member 18. The inner member 18, which has also been heated to the transition temperature of the outer member 16 and is in a deformable state, is deformed and moved into contact with the end portions of the complimentary pipes or fittings 12 and 14. Thereafter, the inner member 18 is heated further to its fusion temperature whereby it fuses with the complimentary fittings 12 and 14.

As shown best in FIG. 1, the inside surface 32 of the inner member 18 is tapered at its opposite ends. That is, the thickness of the inner member gradually decreases over its end portions and when viewed in cross-section as shown in FIG. 1, the inner member has a trapezoidal cross-sectional shape. This shape functions to cause the melted plastic material forming the inner member 18 to flow towards the outer ends of the inner member 18 under the pressure exerted on it by the outer member 16. Such pressurized flow disturbs the surfaces of the complimentary pipes or fittings 12 and 14 being fused and enhances the fusion process whereby good fusion takes place even though the surfaces of the complimentary pipes or fittings are oxidized and have not been adequately scraped.

In operation of the apparatus 10, and still referring to FIGS. 1–4, the pipes or fittings to be joined by the electrofusion fitting 10 are placed within the fitting 10 and aligned as shown in FIG. 1. A source of electric current is next connected to the terminals 28 and 30 of the induction coil 26 by leads 34 and 36 as shown in FIG. 3. The induction coil 26 is then activated by causing an electric current to flow through coil 26 which in turn causes the outer member 16 and inner member 18 to be heated. When the transition temperature of the outer member 16 is reached, it shrinks from its first size shown in FIG. 1 towards its smaller second size whereby the inner member 18 is deformed and clamped against the pipes or fittings 12 and 14 as shown in FIG. 3. Thereafter, the inner member 18 reaches the temperature whereby it fuses with the pipes or fittings 12 and 14 as shown in FIG. 4. As mentioned above, the internal shape of the inner member 18 causes the melted plastic material of the inner member 18 to flow towards the outer ends of the inner member 18 under the pressure exerted on it by the outer member 16. The pressurized flow disturbs the surfaces of the complimentary pipes or fittings 12 and 14 being fused and enhances the fusion process whereby good fusion takes place.

Referring now to FIG. 5, an alternate form of the electrofusion fitting of the present invention is illustrated and designated by the numeral 40. The fitting 40 is similar to the fitting 10 in that it is comprised of an electrically heatable tubular plastic outer member 42 which is formed of the same materials as described above in connection with the fitting 10 and which is shrinkable from a first size to a smaller second size when heated to a transition temperature. An electrically heatable tubular plastic inner member 44 is positioned within the outer member 42 which is comprised of the materials described above in connection with the fitting 10 and fuses with a pair of complimentary pipes or fittings 46 and 48 when heated to a fusion temperature which is higher than the transition temperature of the outer member 42. Instead of an outer sleeve like the sleeve 20 of the fitting 10 containing an induction coil, the induction coil 50 of the fitting 40 is disposed within the outer member 42. The induction coil 50 is connected to terminals 52 and 54 which extend from the outer member 42.

The operation of the fitting 40 is identical to the operation of the fitting 10 described above in that when the induction coil 50 is electrically activated, the outer member 42 shrinks towards its smaller size and clamps the inner member 44 against the outer surfaces of the pipes or fittings 46 and 48. The inner member 44 then fuses with the pipes or fittings.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved heat-shrinkable electrofusion fitting comprising:

an electrically heatable tubular plastic outer member which is shrinkable from a first size to a smaller second size when heated to a transition temperature;

an electrically heatable tubular plastic inner member positioned within said outer member which has an internal size for receiving at least one complimentary plastic fitting to be fused thereto and which melts and fuses with said complimentary fitting when heated to a fusion temperature which is higher than said transition temperature of said outer member; and an electrically activated induction coil positioned with respect to said outer and inner members for simultaneously energizing and causing said members to be heated to said transition temperature and said fusion temperature, respectively, whereby said outer member shrinks towards its smaller size and clamps said inner member against said complimentary fitting and said inner member fuses under pressure with said complimentary fitting.

2. The fitting of claim 1 wherein said outer member is comprised of cross-linked polyethylene and a particulate conductive filler.

3. The fitting of claim 2 wherein said particulate conductive filler in said outer member is a ferromagnetic alloy which heats said outer member to a Curie temperature equal to or above the transition temperature of said outer member when energized by said induction coil.

4. The fitting of claim 2 wherein said transition temperature of said outer member is in the range of from about 130° C. to about 150° C.

5. The fitting of claim 1 wherein said inner member is comprised of medium density polyethylene and a particulate conductive filler.

6. The fitting of claim 5 wherein said particulate conductive filler in said inner member is a ferromagnetic alloy which heats said inner member to a Curie temperature equal to or higher than the fusion temperature of said inner member when energized by said induction coil.

7. The fitting of claim 5 wherein said fusion temperature of said inner member is in the range of from about 180° C. to about 220° C.

8. An improved heat-shrinkable electrofusion coupling comprising:

an electrically heatable tubular outer member comprised of cross-linked polyethylene and a particulate ferromagnetic alloy filler which is shrinkable from a first size to a smaller second size when heated to a transition temperature;

an electrically heatable tubular inner member comprised of medium density polyethylene and a particulate ferromagnetic alloy filler positioned within said outer member which has an internal size for receiving at least one complimentary plastic fitting to be fused thereto and which fuses with said complimentary fitting when heated to a fusion temperature which is higher than said transition temperature of said outer member, said inner member being of a shape such that when melted under pressure, the melted plastic material of said inner member flows towards the outer ends thereof; and an electrically activated induction coil positioned with respect to said outer and inner members for simultaneously energizing and causing said members to be heated to said transition temperature and said fusion temperature, respectively, whereby said outer member shrinks towards its smaller size and clamps said inner member against said complimentary fitting and said inner member melts and fuses under pressure with said complimentary fitting.

9. The coupling of claim 8 wherein said particulate ferromagnetic alloy filler heats said outer member to a Curie temperature equal to or above the transition temperature of said outer member when energized by said induction coil.

10. The coupling of claim 8 wherein said transition temperature of said outer member is about 140° C.

11. The coupling of claim 8 wherein said particulate ferromagnetic alloy filler heats said inner member to a Curie temperature equal to or higher than the fusion temperature of said inner member when energized by said induction coil.

12. The coupling of claim 8 wherein said fusion temperature of said inner member is about 200° C.

13. An improved method of sealingly joining the ends of plastic pipes or tubular plastic fittings together comprising the steps of:

(a) placing said ends of said pipes or fittings within a heat-shrinkable electrofusion coupling comprising an electrically heatable tubular plastic outer member which is shrinkable from a first size to a smaller second size when heated to a transition temperature, an electrically heatable tubular plastic inner member positioned within said outer member which has an internal size for receiving said pipes or fittings to be joined and which fuses with said pipes or fittings when heated to a fusion temperature which is higher than said transition temperature of said outer member, and an electrically activated induction coil positioned with respect to said outer and inner members for simultaneously energizing and causing said members to be heated to said transition temperature and said fusion temperature, respectively; and (b) electrically activating said induction coil to thereby shrink said outer member of said coupling towards its smaller size, clamp said inner member against said ends of said pipes or fittings and fuse said inner member with said pipes or fittings.

14. The method of claim 13 wherein said outer member is comprised of cross-linked polyethylene and a particulate conductive filler.

15. The method of claim 14 wherein said particulate conductive filler is a ferromagnetic alloy which heats said outer member to a Curie temperature equal to or above the transition temperature of said outer member when energized by said induction coil in accordance with step (b).

16. The method of claim 14 wherein said transition temperature of said outer member is in the range of from about 130° C. to about 150° C.

17. The method of claim 13 wherein said inner member is comprised of medium density polyethylene and a particulate conductive filler.

18. The method of claim 17 wherein said particulate conductive filler in said inner member is a ferromagnetic alloy which heats said inner member to a Curie temperature equal to or higher than the fusion temperature of said inner member when energized by said induction coil.

19. The method of claim 17 wherein said fusion temperature of said inner member is in the range of from about 180° C. to about 220° C.

20. The fitting of claim 1 wherein said electrically heatable tubular plastic inner member is of a shape such that when said plastic inner member is melted under pressure, the melted plastic material of said inner member flows towards the outer ends thereof.

21. The method of claim 13 wherein said electrically heatable tubular plastic inner member of said fitting is melted under pressure, the melted plastic material of said inner member flows towards the outer ends thereof.

* * * * *